United States Patent
Hirabayashi et al.

[11] Patent Number: 5,900,910
[45] Date of Patent: May 4, 1999

[54] BLOCK MATCHING METHOD AND APPARATUS WHICH CAN USE LUMINANCE/CHROMINANCE DATA

[75] Inventors: Yasuji Hirabayashi, Kawasaki; Tadashi Yoshida, Ichikawa; Hidefumi Ohsawa, Kawaguchi, all of Japan

[73] Assignee: Canon Kabushiki Kaisha, Tokyo, Japan

[21] Appl. No.: 08/452,859

[22] Filed: May 30, 1995

Related U.S. Application Data

[63] Continuation of application No. 07/902,827, Jun. 23, 1992, abandoned.

[30] Foreign Application Priority Data

Jun. 25, 1991 [JP] Japan ................................. 3-153131
Jun. 25, 1991 [JP] Japan ................................. 3-153147
Aug. 13, 1991 [JP] Japan ................................. 3-202693

[51] Int. Cl.$^6$ ............................................. H04N 7/32
[52] U.S. Cl. ......................... 348/394; 348/413; 348/699
[58] Field of Search ............................... 358/105, 136, 358/13; 348/699, 700, 701, 702, 391, 393, 394, 395, 396, 397, 402, 407, 413, 416

[56] References Cited

U.S. PATENT DOCUMENTS

| | | | |
|---|---|---|---|
| 4,622,547 | 11/1986 | Furukawa et al. | 340/750 |
| 4,622,632 | 11/1986 | Tanimoto et al. | 364/200 |
| 4,639,767 | 1/1987 | Suzuki | 358/105 |
| 4,648,050 | 3/1987 | Yamagami | 364/526 |
| 4,651,211 | 3/1987 | Weckenbrock et al. | 358/105 |
| 4,663,665 | 5/1987 | Tanaka et al. | 358/140 |
| 4,697,176 | 9/1987 | Kawakami | 340/723 |
| 4,736,252 | 4/1988 | Nakagawa et al. | 358/105 |
| 4,739,474 | 4/1988 | Holsztynski | 364/200 |
| 4,773,026 | 9/1988 | Takahara et al. | 364/518 |
| 4,773,044 | 9/1988 | Starji et al. | 364/900 |
| 4,786,820 | 11/1988 | Ogino et al. | 250/578 |
| 4,794,454 | 12/1988 | Sugiyama et al. | 358/105 |
| 4,809,347 | 2/1989 | Nash et al. | 382/49 |
| 4,908,751 | 3/1990 | Smith | 374/200 |
| 4,998,168 | 3/1991 | Gillard | 358/105 |
| 5,029,000 | 7/1991 | Colombo | 358/133 |
| 5,032,914 | 7/1991 | Fujita | 358/105 |
| 5,099,325 | 3/1992 | Artieri et al. | 358/105 |
| 5,122,876 | 6/1992 | Aoki | 358/133 |
| 5,134,480 | 7/1992 | Wang et al. | 358/105 |
| 5,200,820 | 4/1993 | Gharavi | 358/105 |
| 5,206,723 | 4/1993 | Parke | 358/105 |
| 5,376,968 | 12/1994 | Wu et al. | 348/413 |
| 5,440,344 | 8/1995 | Asamura et al. | 348/405 |
| 5,440,346 | 8/1995 | Alattar et al. | 348/420 |
| 5,444,489 | 8/1995 | Truong et al. | 348/422 |

OTHER PUBLICATIONS

Patent Abstracts of Japan, vol. 014441 (Kokai 2–172393) (7/90).

Ishiguro, "VLSI Technologies for HDTV Signal Processing", in Signal Processing of HDTV, L. Chiariglione, ed. Aug. 1989, pp.681–688.

*Primary Examiner*—Bryan Tung
*Attorney, Agent, or Firm*—Fitzpatrick, Cella, Harper & Scinto

[57] ABSTRACT

A movement vector detecting apparatus for detecting a movement vector of an object between frames which are close to each other on a block unit basis is provided. A first mode to detect the movement vector by using color components and a second mode to detect the movement vector by using a luminance component are switched in accordance with chromaticity statistics of an input block, thereby detecting the movement vector. There is also provided an encoding apparatus wherein a difference between an input signal to be encoded and a prediction value is quantized, the quantized signal is generated, the quantized differential signal is inversely quantized the sum of the inversely quantized reproduction differential signal and the prediction value is stored, the stored signal is read out on the basis of an address signal regarding the input signal, the read-out signal and the input signal are received as inputs and the prediction value is obtained, and when the prediction value is derived, an evaluation function to obtain the prediction value is determined in accordance with chromaticity statistics of the input signal.

13 Claims, 5 Drawing Sheets

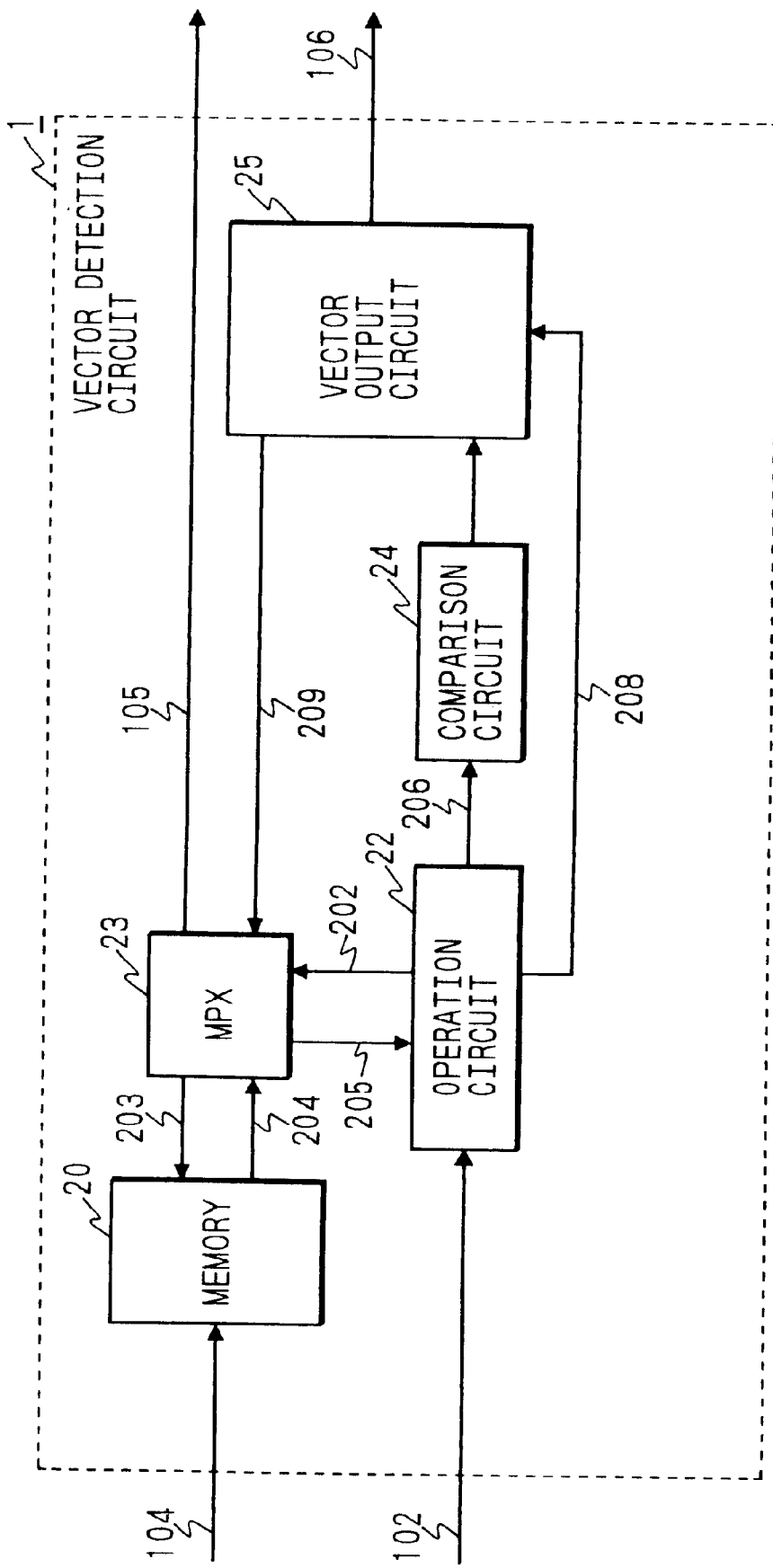

RETRIEVING OF FIRST STAGE BY COLOR DATA

RETRIEVING OF SECOND STAGE BY BRIGHTNESS DATA

RETRIEVING BY ALL SEARCHING SYSTEM

BLOCK MATCHING METHOD AND APPARATUS WHICH CAN USE LUMINANCE/CHROMINANCE DATA

This application is a continuation of application Ser. No. 07/902,827 filed Jun. 23, 1992, now abandoned.

BACKGROUND OF THE INVENTION

1. Field of the Invention

The invention relates to movement vector detecting method/apparatus for detecting a movement vector of an object between frames and also relates to encoding method/apparatus using such vector detecting method/apparatus

2. Related Background Art

What is called a block matching type is known as a movement vector detecting system According to the movement vector detecting system of the block matching type, one block is formed by extracting pixels of (8×8), (16×16), or the like between the previous frame and the present frame; a matching is performed for every block of data, and a movement vector is assigned to each block of the present frame.

A fundamental idea of the movement vector detecting system will now be described in detail hereinbelow A block in which the pixel position at the left upper corner on the present frame is set to (i, j) and which is constructed by m pixels in the lateral direction and n pixels in the vertical direction assumes a vector value $B_{ij}(m, n)$s A block at the same position on the previous frame as that of the block $B_{ij}(m, n)$ assumes a vector value $P_{ij}(m, n)$. In this instance, an evaluation function of an error between B and P is defined as follows;

$$f(i, j) = \sum_{}^{m} \sum_{}^{n} (B_{ij} - P_{i+x, j+y})^2$$

The movement vector is defined by using deviations x and y from i and j such as to obtain the minimum value of f when x and y are changed within a range from ±0 to s (s is a parameter of a retrieving area).

Generally, a color moving image is constructed in a form such that one frame is divided into luminance data (Y) and color difference data ($C_r$, $C_b$, etc.). The luminance data (Y) including much structure information is used to retrieve the movement vector. There is also known a method of retrieving a new vector by using the block just before or the vector obtained in the peripheral block as a center, a method of estimating a movement of the whole picture plane by obtaining a correlation between the vectors which are generated from the individual blocks and the block positions, or the like.

However, an actual meaning image (not a mere set of RGB luminance data but an image having information as what is ordinarily called a picture, such as person, scenery, test pattern, or the like) contains many colors and a set of points of the same hue inherently mean one collected object.

In the usual matching by the blocks using the luminance data, although an error value on calculation can be locally minimized, it is difficult to detect the same-object in the image.

Therefore, when a movement of the whole picture plane is obtained from the vectors or when the vectors generated in the previous block or the peripheral blocks which have been processed are used to retrieve the vector in the present block, then on the contrary a large error is caused.

According to the block matching system, since the amount of calculation is very large, an overly wide range cannot be retrieved Therefore, when a movement of an object is large, the movement width of the block can easily exceed the retrieval range, and the matching cannot be effectively executed

SUMMARY OF THE INVENTION

Under such circumstances, it is an object of the invention to provide a movement vector detecting apparatus which can certainly and radically extract the same object as an object in the present picture plane from picture planes close to the present picture plane and can detect a reliable movement vector and also to provide an encoding apparatus using such a movement vector detecting apparatus.

To accomplish the above object, according to an embodiment of the inventions there is provided a movement vector detecting apparatus for detecting a movement vector of an object between frames which are close to each other, wherein the apparatus comprises: memory means for storing a signal of the second frame close to the first frame to detect a new movement vector; operating means for receiving an input signal supplied on a block unit basis and a signal read out from the memory means on a block unit basis on the basis of address data regarding the input signal and for detecting the block in the second frame which matches with the block in the first frame by using an evaluation function; evaluating means for determining the evaluation function in accordance with the input signal; and output means for generating movement vector data on the basis of the result of the calculation of the operating means.

According to an embodiment of the invention, there is also provided an encoding apparatus comprising: subtracting means for subtracting a prediction value from an input signal to be encoded; quantizing means for quantizing a differential signal which is generated from the subtracting means; encoding means for receiving an output of the quantizing means and encoding; inverse quantizing means for receiving an output of the quantizing means and inversely quantizing; adding means for adding a reproduction differential signal which is generated from the inverse quantizing means and the prediction value; memory means for storing a decoding signal which is generated from the adding means; and predicting means for receiving a signal read out from the memory means on the basis of an address signal regarding the input signal and the input signal and for generating the prediction values wherein in the predicting means, an evaluation function to detect the prediction value is determined in accordance with data information of the input signal Other objects and advantages of the invention will become apparent from the following detailed description taken in conjunction with the accompanying drawings.

BRIEF DESCRIPTION OF THE DRAWINGS

FIG. 4 is a block diagram of a vector detection circuit in FIG. 1 according to the third embodiment.

DETAILED DESCRIPTION OF THE PREFERRED EMBODIMENTS

The first embodiment according to the invention will be described in detail hereinbelow with reference to FIGS. 1 and 2.

Figure 1:
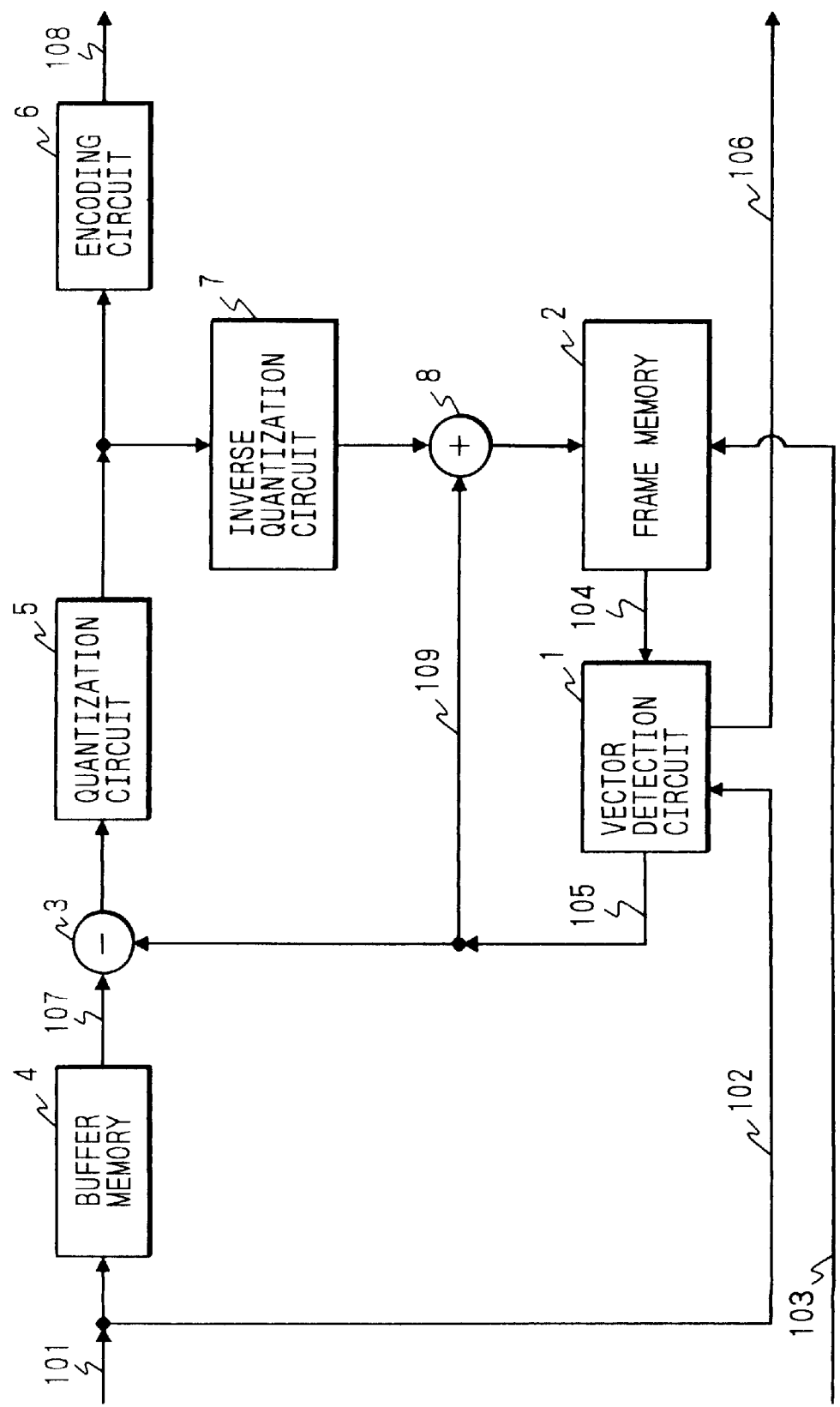
FIG. 1 is a block diagram of a moving image compressing encoding apparatus in the first to third embodiments according to the invention.

FIG. 1 is a block diagram of a moving image compressing encoding apparatus using a vector detection circuit according to the first embodiment of the invention. FIG. 2 is a block diagram showing a construction of the vector detection circuit.

In FIG. 1, reference numeral 1 denotes a vector detection circuit, which will be explained in detail hereinlater; 2 indicates a frame memory to store the previous frame; 3 a subtracting circuit; 4 a buffer memory; 5 a quantization circuit; 6 a reversible encoding circuit; 7 an inverse quantization circuit which performs the operation substantially opposite to that of the quantization circuit 3; and 8 an adding circuit.

The compressing operation of the moving image compressing encoding apparatus with the above construction will now be described in detail.

Image data (brightness L* and chromaticities a* and b* are each expressed by eight bits) of the present frame is supplied to the vector detection circuit 1 on a block unit basis through signal lines 101 and 102 in a form such that one frame is divided into a plurality of blocks.

A block address signal of the block supplied to the vector detection circuit 1 is given to the frame memory 2 through a signal line 103.

The image data in a vector retrieval range around the block is read out from the frame memory 2 in accordance with the block address signal and is sent to the vector detection circuit 1 through a signal line 104.

The vector detection circuit 1 generates the block data which is evaluated to be optimum in a predetermined retrieval range and outputs that to signal lines 105 and 106.

The present image block which has been delayed by a predetermined time by the buffer memory 4 is supplied to the subtracting circuit 3 through a signal line 107. The value of the optimum block is also given to the subtracting circuit 3 through the signal line 105.

The subtracting circuit 3 executes the subtraction between the values of the present image block and the optimum block supplied. Differential value data of the subtracting circuit 3 is supplied to the quantization circuit 5 and is quantized The quantized data is supplied to the encoding circuit 6 and the inverse quantization circuit 7.

The encoding circuit 6 assigns a reversible code to the quantization data and the encoded data is transferred to a signal line 108.

The inverse quantization circuit 7 reproduces a differential value and supplies that value to the adding circuit 8. The optimum block data is also supplied to the adding circuit 8 through a signal line 109. Those two input data are added. The added data is stored into the frame memory 2.

The vector detection circuit 1 shown in FIG. 1 will now be described in detail with reference to FIG. 2.

The previous frame image data of a predetermined retrieval area is supplied from the frame memory 2 (refer to FIG. 1) to a memory 20 through the signal line 104 on the basis of an address signal of the block received through the signal line 103. The image data of the present frame is supplied to an evaluation circuit 21 from the signal line 102 on a block unit basis.

On the basis of the data distribution of the original image block data, the evaluation circuit 21 discriminates (evaluates) whether the block matching is executed in a brightness block matching mode in which it is executed by reference to the brightness (L*), which will be explained in detail hereinbelow, or in a chromaticity block matching mode in which it is executed by the chromaticities (a*, b*), which will be explained in detail hereinbelow. The result of the evaluation is sent to an operation circuit 22 through a signal line 201. An evaluating method of discriminating whether the block matching is performed in the brightness mode or the chromaticity mode will be explained hereinbelow.

A vector to a target block to be matched is sent from the operation circuit 22 to an MPX (multiplexer) 23 through a signal line 202.

The MPX 23 generates an address signal in accordance with the input vector. The address signal is transmitted to the memory 20 through a signal line 203. The MPX 23 receives the block data read out from the memory 20 by means of the address data, through a signal line 204. The block data is supplied to the operation circuit 22 through a signal line 205.

The operation circuit 22 receives the above two block data and calculates an error between the blocks using the following evaluation function equations.

In the case of the L* mode, $$E_{rr} = \sum_{}^{m} \sum_{}^{n} (L_{ij} - L'_{i+x, j+y})^2$$

In the case of the $a*, b*$ mode, $$E_{rr} = \sum_{}^{m} \sum_{}^{n} \{(A_{ij} - A'_{i+x, j+y})^2 + (B_{ij} - B'_{i+x, j+y})^2\}$$

In the above equations, L denotes an L* block; A indicates an a* block; B a b* block: i, j coordinates in the block; and x, y movement vector components. Each reference character provided with a dash (') denotes the corresponding block on the previous frame.

The error value between the blocks and the vector data of the matched block are supplied from the operation circuit 22 to a comparison circuit 24 through a signal line 206.

The comparison circuit 24 selects the minimum one of the data of a number of block matching errors which are calculated for one present block and the vector in this instance and stores them At the time of the completion of the block matching for one present block, the operation circuit 22 sends notification of the end of block matching to a vector output circuit 25 through a signal line 208. In response to that notification, the vector output circuit 25 reads out the vector data stored in the comparison circuit 24 and generates the vector data to the outside of circuit 1 through the signal line 106 and also supplies the read-out signal of the block data to the MPX 23 through a signal line 209. The MPX 23 reads out the block data of the best matching from the memory 20 in accordance with the read-out signal and outputs that block data to the outside of circuit 1 through the signal line 105.

Figure 2:
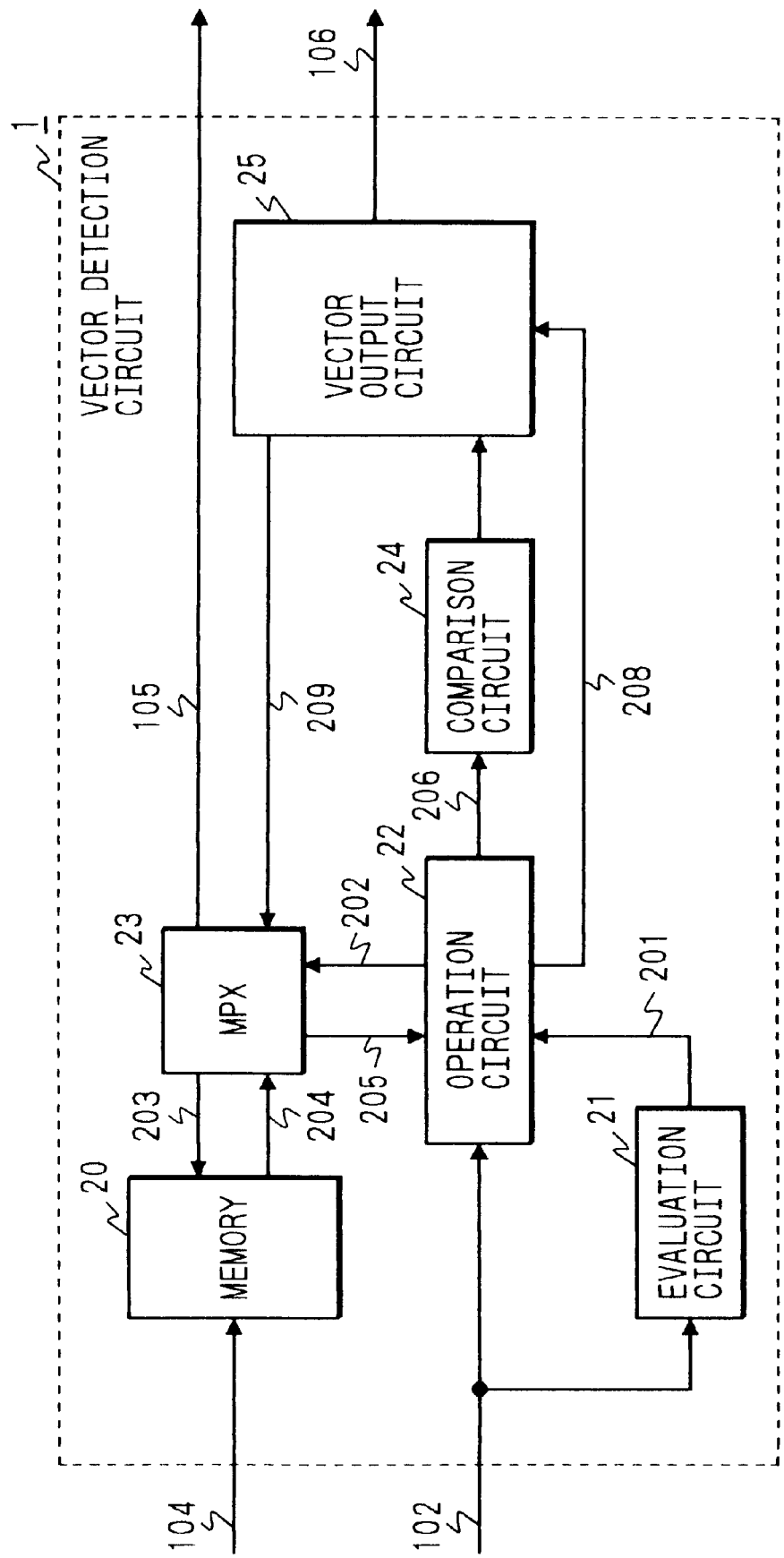
FIG. 2 is a block diagram of a vector detection circuit in FIG. 1 according to the first and second embodiments.

Explanation will now be made with respect to an evaluating method of discriminating whether the block matching in the evaluation circuit 21 shown in FIG. 2 is to be executed by reference to the brightness data (brightness mode) or to the chromaticity data (chromaticity mode)

As for the input block, the brightness (L*=255) denotes white and the chromaticity (a*=127) indicates an achromatic color (the same shall also apply to the case of b*) in the axial direction. It is assumed that when a*=0 and a*=255, the saturations are highest in the two respective directions along the axis (the same shall also apply to b*). The block is constructed of (m×n) pixels. It is now assumed that the block position in the frame is expressed by (i, j) and the pixel position in the block is expressed by (p, q). The data blocks of L*, a*, and b* which are supplied are referred to as $L_{ij}$, $A_{ij}$, and $B_{ij}$. Particularly, in order to describe the pixel position among them, for instance, expression like $L_{ij}(p, q)$ will be employed).

In the evaluation circuit 21, powers in which a data value 127 is used as a reference are calculated with respect to the pixels in the blocks A (a* block) and B (b* block) in accordance with the following equations (the values of powers are set to PA and PB);

$$PA = \sum_{}^{m} \sum_{}^{n} (A_{ij}(p, q) - 127)^2$$

$$PB = \sum_{}^{m} \sum_{}^{n} (B_{ij}(p, q) - 127)^2$$

The value of (PA+PB) is compared with a predetermined threshold values which will be explained hereinbelow. When that value is larger than the predetermined threshold value, it is determined that block matching by reference to the chromaticity block is to be executed for the above blocks. A "1" signal is supplied to the operation circuit 22 through the signal line 201 in FIG. 2. On the other hands when the value of (PA+PB) is equal to or less than the threshold value, it is determined that block matching by reference to the brightness block is to be executed for the above blocks. A "0" signal is supplied to the operation circuit 22 through the signal line 201 in FIG. 2.

That is, the operation circuit 22 automatically switches the block matching mode by means of an output signal of "1" or "0" which is supplied through the signal line 201.

A setting method for setting the threshold value, will now be explained in detail.

Generally, the saturation of the color which appears in a natural image is not extremely high and is nearly equal to or lower than the half of the dynamic range each axis of a* and b*.

Therefore, it is determined that any saturation which is equal to or less than ¼ of the dynamic range is weak and that any saturation larger than ¼ of the dynamic range is strong. When the block exists in an image area having some certain uniform chromaticity, all of the pixels in the block exhibit the same (a*, b*) values. However, in the edge portion of the image area, only parts of the pixels in the block exhibit those (a*, b*) values and the remaining pixels indicate (a*, b*) values corresponding to the background.

It is, accordingly, considered that, on the assumption that all of the portions of the block are filled with the pixels having certain (a*, b*) values, when its power is obtained, it is proper to set a value which is about ½ of that power value to be the threshold value. In this embodiment, a value of about (1024×m x n) is used as a threshold value for (PA+PB).

The second embodiment according to the invention will now be described.

Since the construction of the moving image compressing encoding apparatus and the construction of the vector detection circuit are similar to those in FIGS. 1 and 2 described in the first embodiment, their descriptions are omitted here.

In the second embodiment, the processing operation of the vector detection circuit differs from that described in the first embodiment, and will now be described in detail by reference to FIG. 2.

The previous frame image data of the retrieval area is first supplied from the frame memory 2 (refer to FIG. 1) to the memory 20 through the signal line 104. The present image data is supplied to the evaluation circuit 21 through the signal line 102.

On the basis of the data distribution of the original image blocks, ie the evaluation circuit 21 determines parameters of the evaluation function in the block matching and sends the result to the operation circuit 22 through the signal line 201. A determining method for the parameters of the evaluation function will be explained hereinbelow.

The vector to the target block to be matched is sent from the operation circuit 22 to the MPX 23 through the signal line 202.

The MPX 23 generates the address signal in accordance with the input vector. The address signal is supplied to the memory 20 through the signal line 203. The MPX 23 receives the block data read out from the memory 20 by means of the address data, through the signal line 204. The block data is sent to the operation circuit 22 through the signal line 205.

The operation circuit 22 receives the above two sets of block data and calculates an error between the blocks by means of the following evaluation function equation:

$$E_{rr} = \sum_{}^{m} \sum_{}^{n} \{l(L_{ij} - L'_{i+x,j+y})^2 + a(A_{ij} - A'_{i+x,j+y})^2 + b(B_{ij} - B'_{i+x,j+y})^2\}$$

In the above equation, l, a, and b denote parameters which are determined by the evaluation circuit 21 and will be explained hereinbelow. L denotes an L* block; A an a* block; B a b* block; i, j coordinates in the block; and x, y movement vector components. A reference character provided with a dash (') denotes the block on the previous frame.

The error value between the blocks and the vector data of the matched block are supplied from the operation circuit 22 to the comparison circuit 24 through the signal line 206.

The comparison circuit 24 selects the minimum one of the data of a number of block matching errors which are calculated for one present block and the vector in this instance. At the time of the end of the block matching for one present block, the operation circuit 22 sends a signal indicative of the end of the block matching to the vector output circuit 25 through the signal line 208. In response to that end signal, the vector output circuit 25 reads out the vector data stored in the comparison circuit 24, generates the vector data to the outside of circuit 7 through the signal line 106 and supplies the read-out signal of the block data to the MPX 23 through the signal line 209. In accordance with the read-out signal, the MPX 23 reads out the block data of the best matching from the memory 20 and outputs the block data to the outside of circuit 1 through the signal line 105.

The evaluating method in the evaluation circuit 21 shown in FIG. 2 will now be described.

As for the input block, each of L*, a*, and b* are each expressed by eight bits. In the case of L*, L*=255 denotes white. In the case of a* and b*, a*=127 indicates an achromatic color in the axial direction (the same shall also apply to b*). It is assumed that when a*=0 and a*=255, the saturation is highest in the two respective directions along the axis (the same shall also apply to b*). The block is constructed of (m×n) pixels. It is assumed that the block position in the frame is expressed by (i, j) and the pixel position in the block is expressed by (p, q). The blocks of L*, a*, and b* which are supplied are referred to as $L_{ij}$, $A_{ij}$, and $B_{ij}$. Particularly, to describe the pixel position among them, for instance, expressions like $L_{ij}(p, q)$ are employed.

In the evaluation circuit 21, distribution values in which the data value 127 is used as a reference are calculated with respect to the pixels in the blocks of A (a* block) and B (b* block) in accordance with the following equations, and the calculated values are set to VA and VB;

$$VA = \sum_{}^{m} \sum_{}^{n} (A_{ij}(p, q) - 127)^2 / (m \times n)$$

$$VB = \sum_{}^{m} \sum_{}^{n} (B_{ij}(p, q) - 127)^2 / (m \times n)$$

From these results of the calculations, the larger one of the values of VA and VB is set to VC. The coefficients a, b, and l in the foregoing evaluation function equations are determined by using VA, VB and VC. The relations between (VA, VB, VC) and (a, b, l) satisfy the following equations:

$$a = f_{ab}(VA)$$

$$b = f_{ab}(VB)$$

$$l = f_l(VC)$$

Figure 3:
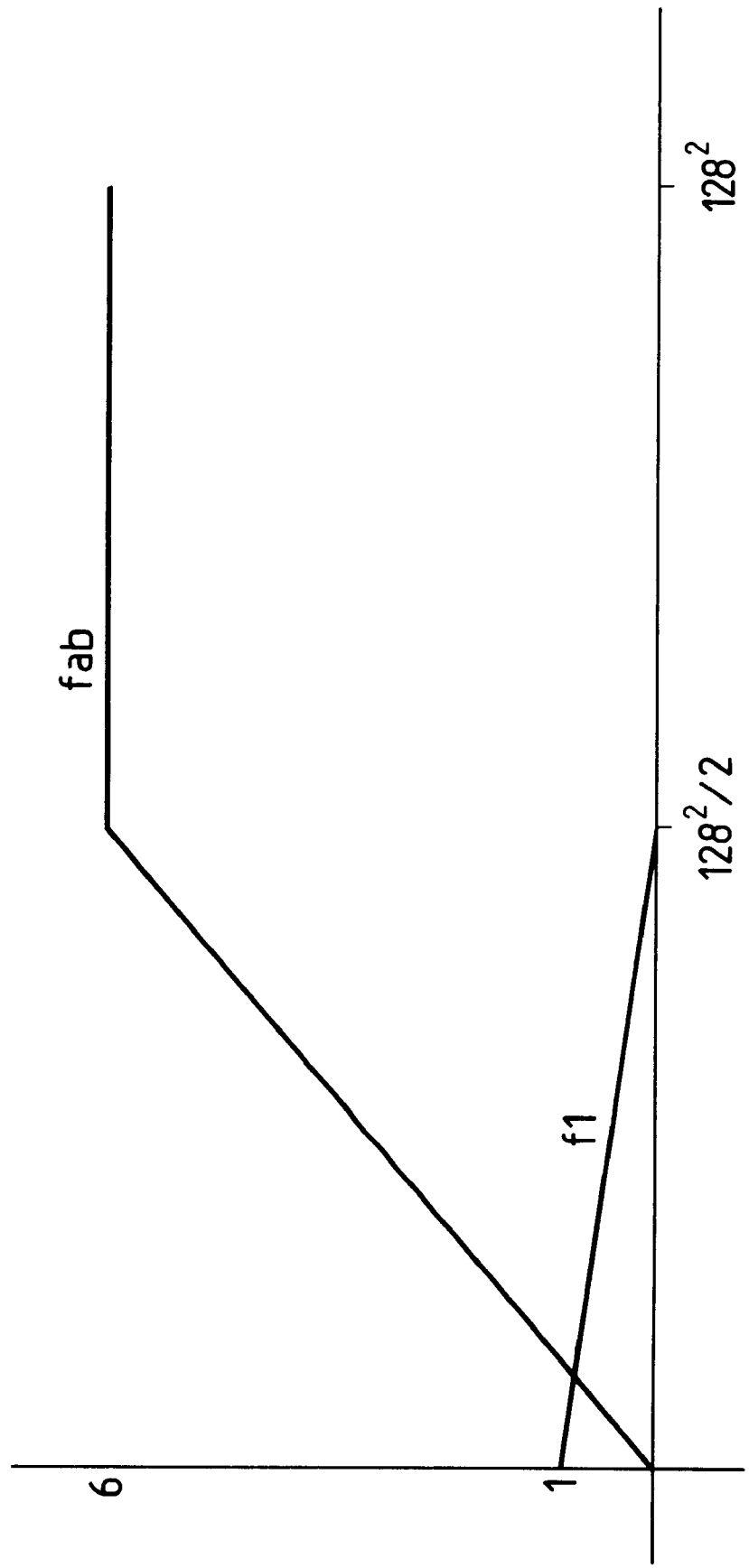
FIG. 3 is a diagram showing functions $f_1$ and $f_{ab}$ to determine parameters of an evaluation function which is used in an operation circuit in FIG. 2 according to the second embodiment.

$f_l$ and $f_{ab}$ denote predetermined functions, and FIG. 3 shows forms of the functions $f_l$ and $f_{ab}$.

The values of the parameters a, be and l determined as mentioned above are generated from the signal line 201 in FIG. 2 and supplied to the operation circuit 22.

A detailed construction of the vector detection circuit 1 in the third embodiment will now be described with reference to FIG. 4. In FIG. 4, the same or similar parts and components as those in FIG. 2 are designated by the same reference numerals and their descriptions are omitted.

As shown in FIG. 4, the third embodiment differs from FIG. 2 in that the evaluation circuit is omitted. The other constructions are substantially the same as those in FIG. 2.

The processing operation of the vector detection circuit 1 shown in FIG. 4 will now be described.

The third embodiment according to the invention will be described in detail hereinbelow.

In the third embodiment an outline of a movement vector detecting system for detecting a movement amount of an object between the previous frame and the present frame on a block unit basis will now be described.

Generally, various objects included in a certain picture plane or a portion of an object are/is colored by colors of almost the same hue, and any change in hue in the same color area is not extremely large.

In the third embodiment, therefore, attention is paid to this point, and the block matching is divided into two stages. That is, color data is used in the block matching in the first stage, and the retrieval and matching are executed in a wide range by coarse steps. The retrieval of the second stage is performed around the location at which the best matching is derived in the first stage. In the matching in the second stage, brightness (lightness, luminance, etc.) data is used and the retrieval and matching are executed by fine steps, thereby enabling both retrieval from a wide range, and retrieval in consideration of the color, to be executed .

There is no need to set the retrieval range to be large the second stage because it is already in the right color area.

The movement vector detecting system will now be described with respect to the moving image compressing encoding apparatus using the vector detection circuit according to the third embodiment as an example L*, a*, and b* similar to those in the first and second embodiments are used as input signals.

Since the construction of the moving image compressing encoding apparatus in the third embodiment is similar to that of FIG. 1 described in the first embodiment, its description is omitted here.

As mentioned above,f the previous frame image data of the retrieval area is loaded into the memory 20 from the previous frame memory 2 through the signal line 104. On the other hand, the present image data is supplied to the operation circuit 22 via the signal line 102 The vector to the target block to be matched is sent from the operation circuit 22 to the MPX 23 through the signal line 202. In response to the vector being received, the MPX 23 generates an address and sends the address to the memory 20 through the signal line 203, receives the block data from the signal line 204 and transmits the block data to the operation circuit 22 by the signal line 205. The operation circuit 22 receives the above two sets of block data and calculates an error between the blocks by the following evaluation function equations. The error values and the vector at the block position are sent to the comparison circuit 24 through the signal lines 206 and 207:

$$E_{rr} = \sum_{}^{m} \sum_{}^{n} \{(A_{ij} - A'_{i+x, j+Y})^2 + (B_{ij} - B'_{i+x, j+Y})^2\} \quad (1)$$

$$E_{rr} = \sum_{}^{m} \sum_{}^{n} (L_{ij} - L'_{i+x, j+y})^2 \quad (2)$$

L denotes a block of L*; A a block of a*; B a block of b*; i, j coordinates in the block; and x, y movement vector components. A reference character provided with a dash (') denotes the block on the previous frame. The equation (1) is used in the matching of the first stage. The equation (2) is used in the matching of the second stage.

Figure 5A:
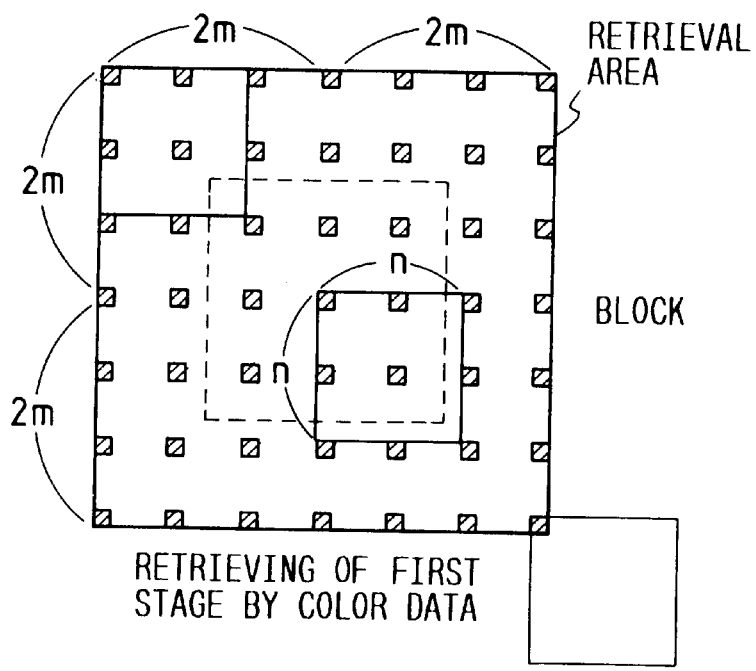
FIGS. 5A to 5C are diagrams for explaining a movement vector retrieving method of the third embodiment.
Figure 5B:
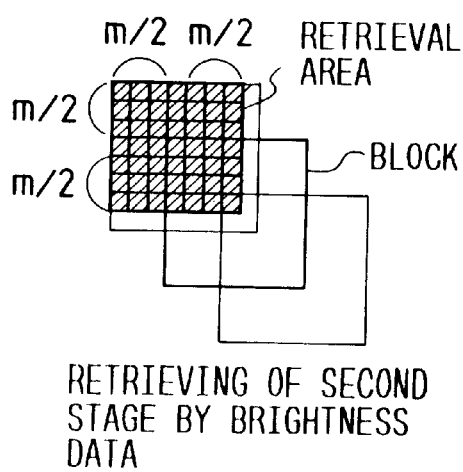

As shown in FIG. 5A, the comparison circuit 24 selects the minimum one of the data of a number of block matching errors by a plurality of (a*, b*) values which are calculated for one present block and the vector in this instance. When the block matching by all of the (a*, b*) values is finished for one present block, as shown in FIG. 5B, the block matching by L* of the second stage is executed in which the vector that gives the best matching is used as a center.

At the time of the completion of the block matching by L* mentioned above, the operation circuit 22 sends notification of the end of the block matching to the vector output circuit 25 through the signal line 208. In response to that end signal the vector output circuit 25 reads out the vector data stored in the comparison circuit 24 and generates the vector data to the outside of circuit 1 by the signal line 106, sends a read-out request signal for the block data to the MPX 23, by the signal line 209. In response to the read-out signal the MPX 23 reads out the block data of the best matching from the memory 20 and outputs that block data to the outside of circuit 1 through the signal line 105. The vector which is generated here is the movement vector which it is desired to obtain.

According to this embodiment as mentioned above a wide retrieval range can be provided. Even when the luminance of the background is close to the luminance of the object or a motion of the object is large, the correct movement vector can be captured. There is also an effect that the number of calculations can be reduced.

Figure 5C:
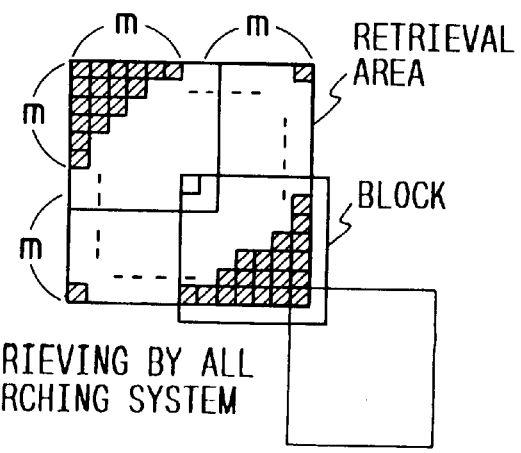

FIG. 5C shows a conventional retrieving system of all searching type as an example. Now, assuming that the block size is set to (n×n) and the retrieval range is set to (2m×2m), the number of calculating times the error must be calculated is equal to $(4 \times n^2 \times m^2)$. In the system of the inventions when it is now assumed that the retrieval range of the first stage is set to $(4m \times 4m)$ and the retrieval range of the second stage is set to $(m \times m)$ and one matching is executed for every four pixels in each of the vertical and lateral directions in the first stage in such a range, and that the matching is performed for every pixel in the second stage, the number of times the error has to be calculated in each of the first stage is equal to $(n^2 \times m^2)$ so that the total number of error calculations times is equal to $(2 \times n^2 \times m^2)$. Therefore, the retrieval of the range of $(4m \times 4m)$ can be performed with half as many calculations as are required to retrieve the range of $(2m \times 2m)$ conventionally.

As described in detail above, in the movement vector detecting apparatus according to the invention, in the case of the first embodiment, the apparatus has a first mode to detect the movement vector by using color data as the color image information and a second mode to detect the movement vector by using the luminance data as the color image information, and executes the detection of the movement vector in either of the first and second modes.

In the second embodiment, the color data and the luminance data are adaptively weighted and the movement vector is detected accordingly.

In the third embodiment, after retrieval by means of color data is performed, the retrieval by mean of luminance data is executed, thereby detecting the movement vector.

By the movement vector detecting method in each of the embodiments described above, even when the luminance of the background is close to the luminance of the object or the motion of the object is large, the correct movement vector can be detected.

Therefore, in the case where the motion of a whole picture plane is presumed from the movement vector of each block or the movement vector of a new block is presumed from the past movement vectors or the movement vectors of the blocks around the target block, the movement vector can be accurately presumed.

On the other hand, by performing a predictive encoding to an image by using the above movement vector detecting apparatus, the image can be obviously efficiently compressed.

The present invention can be embodied by various forms without departing from the spirit and main features of the invention.

For instance, although the brightness data (L*) and chromaticity data (a*, b*) have been used in the above embodiments, the invention obviously can also be obviously realized by using the luminance data and color difference data (Y, Cr, Cb; Ye I, Q; L; U, V; etc. ).

Further, the present invention can be applied to a system comprising a plurality of apparatuses or to a single apparatus. Or, the invention obviously can also be applied to a case where it is accomplished by supplying a program to the system or apparatus.

In other words, the foregoing description of the preferred embodiments has been given for illustrative purposes only and not to be construed as imposing any limitation in every respect.

The scope of the invention is, therefore, to be determined solely by the following claims and not limited by the text of the specifications and alternations made within a scope equivalent to the scope of the claims fall within the true spirit and scope of the invention.

What is claimed is:

1. A movement vector detecting apparatus for detecting a movement vector of an object between pictures which are close to each other, comprising:

a) memory means for storing a signal of a second picture close to a first picture corresponding to an input signal;

b) evaluating means for selecting an evaluation functional equation from a plurality of evaluation functional equations in accordance with the input signal to be used for detecting a movement vector of the picture;

c) operating means for receiving the input signal supplied on a block unit basis and a stored signal read out on a block unit basis from said memory means on the basis of address data regarding the input signal and for detecting a block in the second picture which matches a block of the first picture by using the evaluation functional equation selected by said evaluating means; and d) output means for generating movement vector data on the basis of the result of the calculation by said operating means.

2. A movement vector detecting apparatus for detecting a movement vector of an object between pictures which are close to each other, comprising:

a) memory means for storing a signal of a second picture close to a first picture corresponding to an input signal;

b) evaluating means for determining an evaluation functional equation, to be used for detecting a movement vector of the picture, said evaluating means being capable of setting at least two kinds of evaluation functional equations in accordance with the input signal;

c) operating means for receiving the input signal supplied on a block unit basis and a stored signal read out on a block unit basis from said memory means on the basis of address data regarding the input signal, and for detecting a block in the second picture which matches with a block of the first picture by using the evaluation functional equation determined by said evaluating means; and d) output means of generating movement vector data on the basis of the result of calculating by said operating means.

3. An apparatus according to claim 2, wherein said evaluating means chooses between a mode to detect the block to be matched by using color components and a mode to detect a block to be matched by using a luminance component.

4. An apparatus according to claim 2, wherein said evaluating means determines coefficients of said determined evaluation functional equation.

5. A movement vector detecting apparatus for detecting a movement vector of an object between pictures which are close to each other, comprising:

a) memory means for storing a signal of a second picture close to a first picture corresponding to an input signal;

b) operating means for receiving the input signal of the first picture supplied on a block unit basis and a signal read out from said memory means on a block unit basis and for discriminating a block of the second picture to be matched with a block of the first frame, by using at least one of a first evaluation functional equation to execute discrimination on the basis of color components and a second evaluation functional equation to execute the discrimination on the basis of a luminance component according to the input signal, the first evaluation functional equation and the second evaluation functional equation being different from each other; and c) output means for generating movement vector data on the basis of the result of calculation by said operating means.

6. An apparatus according to claim 5, wherein said operating means performs the discrimination of the matched block using the first evaluation functional equation and, thereafter, executes the discrimination of the matched block using the second evaluation functional equation on the basis of the result of the discrimination of the matched block.

7. A movement vector detecting apparatus for detecting a movement vector of an object between pictures which are close to each other, comprising:

a) memory means for storing a signal of a second picture close to a first picture corresponding to an input signal;

b) evaluating means for evaluating chromaticity statistics of the input signal;

c) operating means for receiving an input signal of said first picture supplied on a block unit basis and a signal read out from said memory means on a block unit basis and for discriminating a block of the second picture to be matched with a block of the first picture, in which said operating means selectively uses a first evaluation functional equation to execute discrimination on the basis of color components and a second evaluation functional equation to execute discrimination on the basis of an output of said evaluating means, the first evaluation functional equation and the second evaluation functional equation being different from each other; and d) output means for generating movement vector data on the basis of the result of the calculation by said operating means.

8. A movement vector detecting method of detecting a movement vector of an object between pictures which are close to each other on a block unit basis, wherein, when the movement vector is detected, an evaluation functional equation to execute an evaluation for chromaticity power in a block is provided, an output value of said evaluation functional equation is compared with a predetermined threshold value, and a block matching by color components and a block matching by a luminance component are adaptively selected in accordance with the comparison result, thereby detecting the movement vector.

9. A movement vector detecting method of detecting a movement vector of an object between pictures which are close to each other on a block unit basis, wherein a first mode to detect the movement vector by using color components and a second mode to detect the movement vector by using a luminance component are selected in accordance with chromaticity power of an input block, thereby detecting the movement vector.

10. A movement detection apparatus, comprising:

input means for inputting an image signal;

memory means for storing the image signal input by said input means; and detecting means for detecting movement of the input image signal by comparing the input image signal with the image signal stored in said memory means, wherein said detecting means detects the movement by selectively using a first detection mode for detecting the movement based on a luminance component of the image signal and a second detecting mode for detecting the movement based on chrominance components of the image signal according to chromaticity power of the input image data.

11. An apparatus according to claim 10, further comprising block forming means for dividing the image signal input by said input means into blocks and outputting the blocks to said memory means.

12. A movement detecting apparatus, comprising:

input means for inputting an image signal;

memory means for storing the input image signal input by said input means; and detection means for detecting movement in the input image signal by comparing the input image signal with the image signal stored in said memory means, wherein said detection means selects an evaluation functional equation from various evaluation functional equations to be used to detect a movement vector of the input image signal, according to the input image signal, and detects the movement vector on the basis of the selected evaluation functional equation.

13. An apparatus according to claim 12, further comprising block forming means for dividing the image signal input by said input means for dividing the image signal input by said input means into blocks and outputting the blocks to said memory means.

* * * * *

UNITED STATES PATENT AND TRADEMARK OFFICE
CERTIFICATE OF CORRECTION

PATENT NO. : 5,900,910

DATED : May 4, 1999

INVENTOR(S): YASUJI HIRABAYASHI, ET AL.

Page 1 of 4

It is certified that error appears in the above-identified patent and that said Letters Patent is hereby corrected as shown below:

References cited [56]

U.S. PATENT DOCUMENTS

"Starji et al." should read --Sfarti et al.--.

ABSTRACT [57]

Line 12, "quantized" (first occurrence) should read --quantized,--.

COLUMN 1

Line 17, "system" should read --system.--.
Line 25, "hereinbelow" should read --hereinbelow.--.
Line 29, "avector" should read --a vector--, and "(m, n)s" should read -- (m, n).--.
Line 61, "same-object" should read --same object--.

UNITED STATES PATENT AND TRADEMARK OFFICE
CERTIFICATE OF CORRECTION

PATENT NO. : 5,900,910

DATED : May 4, 1999

INVENTOR(S) : YASUJI HIRABAYASHI, ET AL.

It is certified that error appears in the above-identified patent and that said Letters Patent is hereby corrected as shown below:

COLUMN 2

```
Line 3,  "retrieved" should read --retrieved.--.
Line 6,  "executed" should read --executed.--.
Line 11, "radically" should read --reliably--.
Line 20, "the-apparatus" should read --the apparatus--.
Line 41, "which-is" should read --which is--.
Line 50, "signal" should read --signal.--.
```

COLUMN 3

```
Line 22, "circuit ." should read --circuit.--.
```

COLUMN 4

```
Line 50, "them" should read --them.--.
Line 67, "mode)" should read --mode).--.
```

COLUMN 5

```
Line 11, "expression" should read --expressions--.
Line 31, "hands" should read --hand,--.
```

UNITED STATES PATENT AND TRADEMARK OFFICE
CERTIFICATE OF CORRECTION

PATENT NO. : 5,900,910

DATED : May 4, 1999

INVENTOR(S) : YASUJI HIRABAYASHI, ET AL.

It is certified that error appears in the above-identified patent and that said Letters Patent is hereby corrected as shown below:

COLUMN 6

Line 10, "blocks₁e" should read --blocks,--.
    Line 51, "circuit 7" should read --circuit 1--.

COLUMN 7

Line 9, "VB;" should read --VB:--.
    Line 17, "these" should read -- the--, and "the" (first occurrence) should read --these--.
    Line 20, "IVA," should read --(VA,--.

COLUMN 8

Line 9, "above,f" should read --above,--.
    Line 21, "equations." should read --equations,--.
    Line 22, "The" should read --after which the--.
    Line 51, "circuit 1" should read --circuit 1,--, and "106," should read --106, and--.

UNITED STATES PATENT AND TRADEMARK OFFICE
CERTIFICATE OF CORRECTION

PATENT NO.   :   5,900,910

DATED        :   May 4, 1999

INVENTOR(S) :   YASUJI HIRABAYASHI, ET AL.

It is certified that error appears in the above-identified patent and that said Letters Patent is hereby corrected as shown below:

<u>COLUMN 9</u>

Line 1, "calculating" should be deleted.
Line 8, "each of the first stage" should read --each of the first and second stages--.
Line 9, "times" should be deleted.
Line 47, "obviously" (second occurrence) should be deleted.
Line 49, "Ye" should read --Y,--.

Signed and Sealed this

Twenty-eighth Day of December, 1999

Attest:

Q. TODD DICKINSON

*Attesting Officer*     *Acting Commissioner of Patents and Trademarks*